United States Patent
Antilli

(10) Patent No.: US 7,831,032 B2
(45) Date of Patent: Nov. 9, 2010

(54) SYSTEM AND METHOD FOR THE ESTABLISHMENT OF A CONNECTION BETWEEN A CONTACT REQUESTER AND A COMMUNICATIONS CENTER

(76) Inventor: Davide Antilli, 16a Westow St., London, SE19 3AH (GB)

( * ) Notice: Subject to any disclaimer, the term of this patent is extended or adjusted under 35 U.S.C. 154(b) by 282 days.

(21) Appl. No.: 10/549,392

(22) PCT Filed: Mar. 12, 2004

(86) PCT No.: PCT/EP2004/002657
§ 371 (c)(1),
(2), (4) Date: Sep. 5, 2006

(87) PCT Pub. No.: WO2004/082250
PCT Pub. Date: Sep. 23, 2004

(65) Prior Publication Data
US 2007/0041564 A1 Feb. 22, 2007

(30) Foreign Application Priority Data
Mar. 14, 2003 (GB) ................................. 0305809.6

(51) Int. Cl.
*H04M 3/00* (2006.01)
(52) U.S. Cl. .............................. 379/265.02; 379/265.09; 379/265.13; 379/266.02; 379/269; 379/210.01
(58) Field of Classification Search ............ 379/265.04, 379/32.04, 211.01, 265.09, 265.13, 266.02, 379/269, 210.01
See application file for complete search history.

(56) References Cited
U.S. PATENT DOCUMENTS

| | | | | |
|---|---|---|---|---|
| 5,155,761 | A * | 10/1992 | Hammond | 379/88.2 |
| 5,274,700 | A * | 12/1993 | Gechter et al. | 379/211.01 |
| 5,465,286 | A * | 11/1995 | Clare et al. | 379/32.04 |
| 6,049,602 | A * | 4/2000 | Foladare et al. | 379/265.04 |
| 6,356,633 | B1 | 3/2002 | Armstrong | |
| 6,671,366 | B1 * | 12/2003 | Isotalo | 379/221.08 |
| 6,792,102 | B2 * | 9/2004 | Shires | 379/265.04 |
| 6,845,155 | B2 * | 1/2005 | Elsey | 379/266.04 |

(Continued)

FOREIGN PATENT DOCUMENTS

| | | |
|---|---|---|
| EP | 0539105 A2 | 4/1993 |
| EP | 0539105 A3 | 4/1993 |
| EP | 0740450 A2 | 10/1996 |
| EP | 0740450 A3 | 10/1996 |
| EP | 1073249 A2 | 1/2001 |

(Continued)

OTHER PUBLICATIONS

Harvey, et al., "Call Center Solutions", AT&T Technical Journal, Sep.-Oct. No. 5, pp. 36-44 (1991).

*Primary Examiner*—Curtis Kuntz
*Assistant Examiner*—Phung-Hoang J Nguyen
(74) *Attorney, Agent, or Firm*—Steven J. Hultquist; Intellectual Property Technology Law

(57) ABSTRACT

A system for establishing a connection between a contact requester (i.e. a potential customer) and a communications center is disclosed. The system has a message receiver which accepts a message from a communications device, such as a mobile telephone or a PDA, and a contact number. The contact number is usually the number of the mobile telephone or PDA. The system has furthermore a parser for parsing the message and identifying one or more identifiers in the message, including a destination identifier. The destination identifier indicates the number of a communications center, such as a call center, to which the message should be sent. A connector in the system uses the destination identifier and the contact number to establish a connection between a requested one of the communications centers and the contact requester.

17 Claims, 3 Drawing Sheets

U.S. PATENT DOCUMENTS

| | | | |
|---|---|---|---|
| 7,466,805 B2 * | 12/2008 | Timmins et al. | 379/114.13 |
| 7,631,299 B2 * | 12/2009 | Kannenberg | 717/121 |
| 2002/0143662 A1 * | 10/2002 | Clark et al. | 705/27 |
| 2003/0133562 A1 * | 7/2003 | Ooki | 379/242 |
| 2004/0062380 A1 * | 4/2004 | Delaney | 379/265.02 |

FOREIGN PATENT DOCUMENTS

| | | |
|---|---|---|
| EP | 1168791 A2 | 6/2001 |
| EP | 1168791 A3 | 6/2002 |
| EP | 1195975 A2 | 4/2005 |
| EP | 1195975 A3 | 4/2005 |
| GB | 0306747.7 | 9/2003 |
| GB | 2395093 A | 5/2004 |
| NZ | 522421A20030228 | 2/2003 |
| WO | WO0205533 | 1/2002 |
| WO | WO03019959 | 3/2003 |

* cited by examiner

SYSTEM AND METHOD FOR THE ESTABLISHMENT OF A CONNECTION BETWEEN A CONTACT REQUESTER AND A COMMUNICATIONS CENTER

CROSS-REFERENCE TO RELATED APPLICATIONS

This application is filed under the provisions of 35 U.S.C. §371 and claims the priority of International Patent Application No. PCT/EP2004/002657 filed 12 Mar. 2004, which in turn claims priority of Great Britain Patent Application No. 0305809.6 filed 14 Mar. 2003.

TECHNICAL FIELD

The application concerns a system for establishing a connection between a contact requester and a communications centre as well as a method for establishing this connection.

PRIOR ART

Systems for establishing a connection between a customer and a call centre are known in the art. In the simplest system, a customer dials the number of a call centre and the call is placed in a waiting pattern until the next available staff member, such as an agent or representative, is able to take the call. It is possible in this prior art system to have different numbers for different staff members or groups of staff members.

More refined systems use IVR (Interactive Voice Recognition) technology in which the customer is initially presented with a menu of options and is able to select the option desired by use of a touch-tone telephone. This allows a more efficient handling of incoming calls since the customer is connected only to the staff member who is most competent to handle the incoming call. Nonetheless, if the customer has to wait a long time until a call is answered, the customer can become impatient and may hang up. As a result, a potential customer contact is lost to the company using the call centre.

Accompanying the development of mobile telephone technology has been the growth in messaging services. The initial GSM telephones provided the opportunity to send short text messages via a service known as the short message service (SMS). More recently, SMS services have also been provided over the public switched telephone network (PSTN). In addition, mobile telephone services have developed new messaging services such as I-mode and multi-media messaging services (MMS). Messaging services have been used to send messages to a communications centre, such as a call centre, in order to take part in games or to subscribe to information services. For example, customers can request news about the stock market or about their favourite football team to be sent to them on a regular basis. These prior art services require the use of multiple telephone numbers to request the service which means that the potential customer has to first know the number to which the message is to be sent and then sends a text message to the number to request the service.

SUMMARY OF THE INVENTION

There is therefore a need to eliminate the need to wait "on-hold" when establishing a contact with a communications centre.

There is furthermore a need to reduce the number of numbers required to access a plurality of call centres.

There is yet a further need to reduce or eliminate the routing complexity when establishing contact with a communications centre.

In order to overcome the above problems, the application described herewithin relates to a system for establishing a connection between a contact requester and a communications centre. The system comprises a message receiver for accepting a message and a contact number, a parser for parsing or interpreting the message and thus identifying one or more identifiers in the message, including a destination identifier, and a connector. The connector uses the destination identifier and the contact number to establish a connection between a requested one of a plurality of communications centres and the contact requester.

This system has the advantage that the contact requester, such as a potential customer, can send a message to a communication centre, such as a call centre, to request contact to be made so that the contact requester can discuss his or her needs with a representative at the communication centre. These needs could include information about a product or service, or an order for a product or service. The contact requester does not need to spend time "on-hold" in a wait queue at the communications centre and also does not need to navigate through a range of IVR menu choices. The operators of the communication centre ensure that calls are not lost due to frustrated customers putting down the telephone before being able to speak to a staff member. Furthermore, the system saves on technical resources, which would otherwise be used to organise and monitor incoming phone calls.

The communications centre of the application can be anything for a small, one-person business to a large, multi-user call centre with a large number of agents answering the telephone for several customers.

The connection between the contact requester and the communication centre is made in one embodiment over the public switched telephone network. It could also be made by a voice call over a computer network, such as the Internet, or by means of the exchange of e-mail messages. Other methods are conceivable to the person skilled in the art.

The system furthermore allows the use of one single number to which all messages are sent. Not only does this make the system simple to use for the contact requester, but it also frees up numbers which would otherwise be occupied.

In one embodiment of the invention, the system includes a look-up table having a list of communications centres and a correlated list of destination identifiers. The connector uses the look-up table to establish the requested one of the plurality of communications centres from the destination identifier. The destination identifier in the message can be one of a multitude of identifiers that the system uses to identify one particular communication centre. These destination identifiers include, but are not limited to, brand names, company names, trading names, products and/or service descriptions, locations, and/or requester identifiers. A subscriber to the service offered by the system can use as many identifiers as it wishes to direct calls to the appropriate communications centre.

In a particularly advantageous embodiment of the system, a request queuer is provided for queuing in a queue attempts to establish the connection between the contact requester and the requested one of the plurality of communications centres. This ensures that no requests for connection are lost when all of the staff members at the communication centre are busy.

The connector first establishes a communications centre connection between the connector and the communications centres and subsequently establishes a contact requester connection between the connector and the contact requester. This has the advantage that the contact requester is immediately placed in contact with the staff member in the communications centre and does not have to waste time whilst the contact with the communications centre is established.

The connector can pass to the communications centre at least one of the one or more identifiers. This enables the staff member or a computer application in the communications centre to identify quickly the service or information desired by the contact requester and can call up the appropriate information from a database. The identifier passed could include the contact number which would allow the staff member to use a customer relationship management system to identify the contact requester and help him or her more quickly and in greater detail.

Preferably, the system further includes a first timer for timing the length of time required to establish the communications centre connection and a second timer for re-timing a contact requester connection. This has the advantage that the time for establishing a connection can be monitored and also ensures that little time is wasted if either the contact person or the communications centre is not reachable to establish the connection. In the latter case, for example the request queuer can re-order the request in the request queue and an attempt established later to connect the communications centre to the contact requester. In the former case, the system can cancel further attempts to establish a connection between the contact requester and the communications centre.

The system of the invention also monitors the number of staff members available to take requests by means of a list at the communications centre. The list holds the access details of staff members to whom requests may currently be sent. This ensures that no requests are sent to staff members who are not currently working, thus wasting time and system resources.

The invention further includes a communications centre for use with the above system. This communications centre comprises a plurality of work stations for use by staff members and a connection acceptor for accepting a communications centre connection and for passing the request to one of the plurality of work stations. As mentioned above, for efficient functioning of the system, the communications centre can include a customer relationship management system accessible by the staff members to allow the access of data in the customer relationship management system by means of the contact number.

The object of the invention is also solved by providing a method of requesting the establishment of a connection between a contact requester and a communications centre comprising:
 a step of sending to a central unit a message and a contact number, the message having one or more identifiers, including a destination identifier, the destination identifier establishing the identity of one of the plurality of communications centres;
 a step of parsing the message at the central unit to determine the destination identifier;
 a step of establishing the connection between the contact requester and requested one of the plurality of communications centres.

As mentioned above, this method allows a contact requester, for example a potential customer, to establish contact with a communications centre, such as a call centre, in order to obtain more information about a product or service and, if desired, to order this product or service.

DETAILED DESCRIPTION OF THE INVENTION

Figure 1:
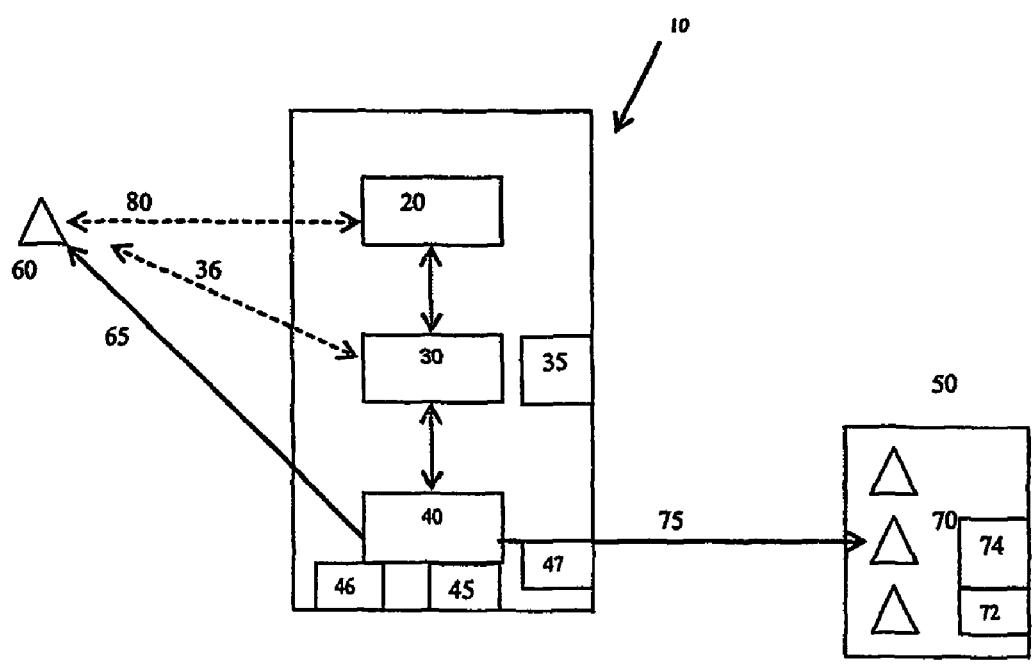
FIG. 1 shows an outline of the system according to this application.

In the embodiment of a system 10 described herewithin and illustrated in FIG. 1, a system 10 consists essentially of three modules: an SMS gateway 20 to receive and send SMS messages; an SMS interpreter 30 to interpret the SMS message and establish the subscriber details and a telephony system 40 to queue call requests and establish connection between customers 60 and agents 70 in a call centre 50.

This embodiment of the invention is described using the SMS feature currently available on all GSM compatible mobile telephone systems, it will be understood that the principles of the invention are equally applicable to other messaging services. Connection is described as being made through a public switched telephone network and the GSM mobile network. Again it will be understood that the connection could be made by other means, such as a dedicated landline, through the internet or using mobile networks designed with other standards.

Figure 2:
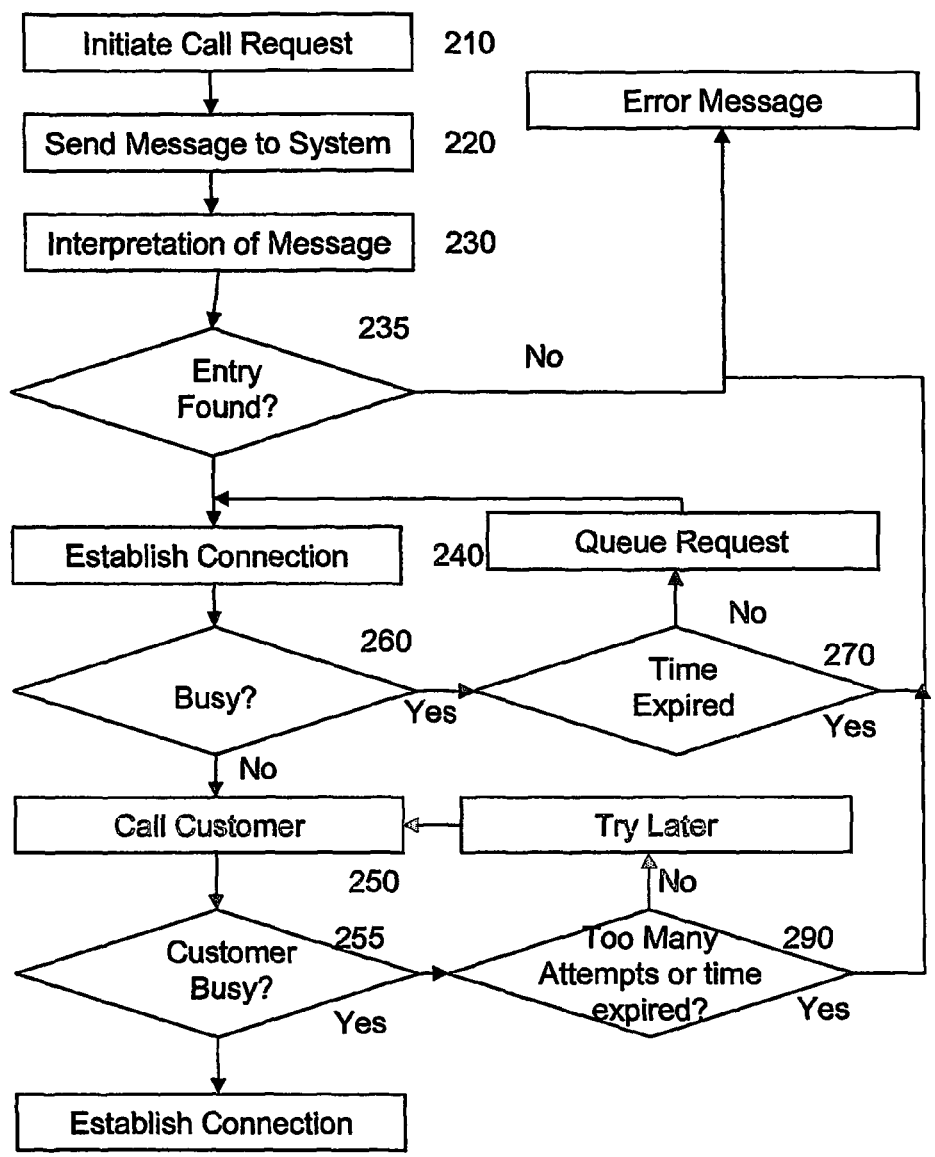
FIG. 2 shows a flow diagram of the method according to this application.

FIG. 2 shows a flow diagram of the method described in this application.

The customer 60 who wishes to reach the agent 70 in the call centre 50 first of all initiates a call request in step 210. The customer 60 does this by entering a text message into his mobile telephone (or PDA or other suitable device) indicating the service desired. The service could be, for example, an airline company as the customer wishes to book an airline flight. The customer 60 would then enter the name of the airline company. The text message is then sent to a number. This number is not exclusive to the airline company, but is a central telephone number through which a number of call centres 50 can be reached as will be explained below. Similarly a customer might wish to order a pizza, in which case the name of the pizza delivery service would be sent to the central telephone number.

The agents 70 in the call centre 59 are provided with work stations comprising a computer with modem which can also incorporate a CTI system.

In this example, the text message is sent in an SMS format. However, other text formats could be used. Indeed other formats, such as audio formats, video formats or image formats might be sent. In one embodiment, the display of the mobile telephone (or other suitable device) could be a graphical user interface and by selecting one of the icons on the graphical user interface, a message appropriate to the service desired could be sent to the system 10.

Figure 3:
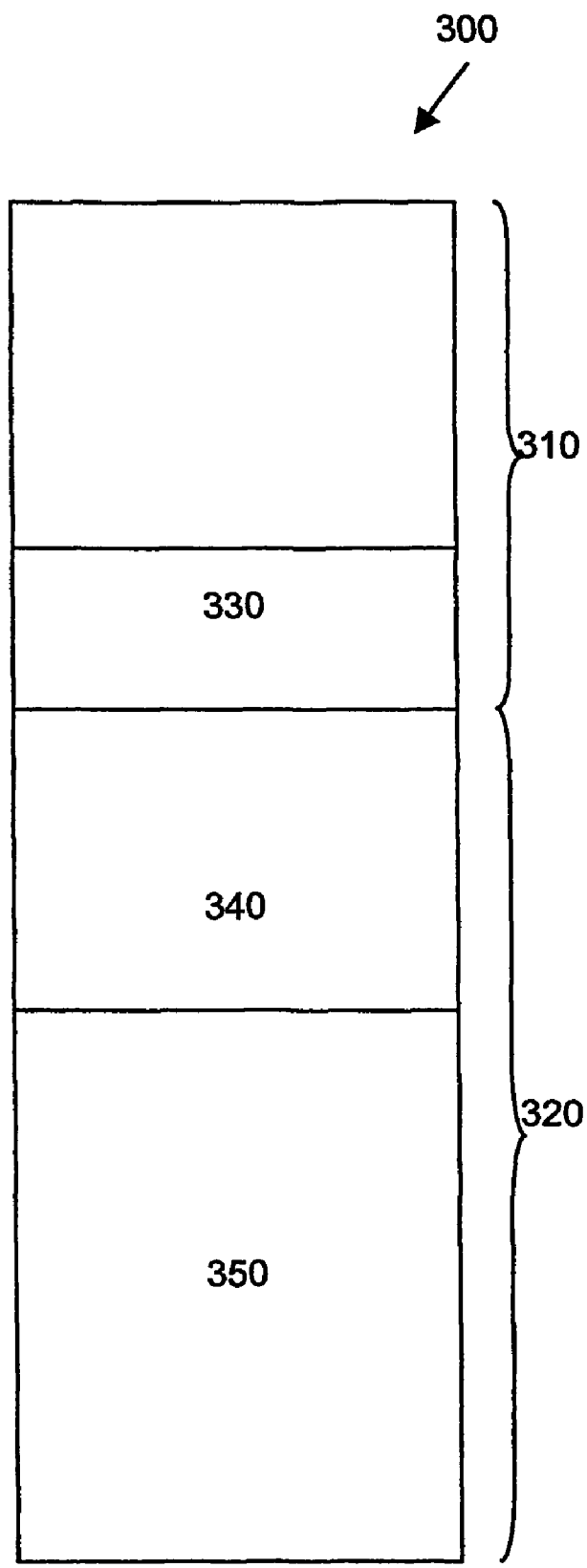
FIG. 3 shows the message format used in this application.

The message is then sent in step 220 via the messaging service—in this case as an SMS message 80—to the SMS gateway 20 in the system 10. The SMS gateway 20 in the system 10 is reached by using a single number. One example of the format of the text message is shown in FIG. 3. The message 300 of FIG. 3 comprises a header 310 and a body 320. In the header 310, a field 330 indicates the contact number and in the body 320 a first field 340 contains the destination identifier and a second field 350 contains further identifiers. Among the identifiers a language identifier could be included to indicate the preferred language which the customer 60 prefers to use. This format is used within the SMS message protocol, but other formats could be used.

In step 230 the message is interpreted by the SMS interpreter 30 to retrieve the identifier of the ultimate destination. In the simple example cited above, the message would be interpreted as merely indicating the name of the airline company or the pizza delivery service that the customer 60 wished to contact. This would be found in the first field 340 of the message 300.

Using a database 35, the SMS interpreter 30 establishes in step 230, the number of the call centre 50 which handles airline bookings and in step 240 attempts to establish a telephony connection 75 using the telephony system 40 with an agent 70 in the call centre 50. If a connection is successfully established, the telephony system 40 calls the customer 60 in step 250 to establish a telephony connection 65 on the customer's mobile and a telephone (voice) connection is thereby established between the call centre 50 and the customer 60.

If the SMS interpreter 30 is unable to interpret the message 80, 300 or find an entry in the database 35, an error message 36 is returned in step 235 to the customer 60 requesting clarification.

In the event that no telephony connection 75 is established in step 240 with the agent 70 in the call centre 50, the telephony system 40 queues the request in step 260 in a queue 45 and when an agent becomes free makes a connection. Both the SMS gateway 30 and the telephony system 40 further include a first timer 46 and, if after a period of time has elapsed (typically 6 minutes) or a number of attempts made, no connection has been established, the telephony system 40 cancels the request in the queue 45. The SMS gateway 30 sends a message 36 in step 270 to the customer 60 that it has been unable to establish a connection. This might, for example occur if all agents 70 are busy for more than the period of time.

If, in step 255, the telephony system 40 is unable to reach the customer 60, then the telephony system connects the agent 70 with another customer 60 in step 280, and places the initial customer's request for connection at the bottom of the queue 45. A second timer 47 records the time that has elapsed since the unsuccessful attempt to reach the customer was made. A further attempt at connecting the agent 70 to the customer 60 is then made when the request reaches the top of the queue as long as the second timer 47 records a suitable time interval between the unsuccessful attempt and the new attempt This time interval could be 30 s to 60 s. If, after the time period recorded in the first timer 46 has elapsed and/or a specified number of unsuccessful attempts to make telephony connection with the customer 60 has been exceeded and no connection is made, a message 36 is sent in step 290 from the SMS gateway 20 to the customer 60 informing him or her that no telephony connection has been possible. This might occur, for example if the customer 60 moves out of range of a transmitting station or takes another call.

The database 35 includes the names of the services provided by the call centres 50. This could be the name of the company name, trading name or brand names. Call centres subscribing to the service would be free to choose the entries in the database 35 which they wished to use. It is possible, for example, that multiple entries in the database 35 are related to the same call centre 50.

The SMS interpreter 30 can also interpret additional entries in the message. If, for example, the customer 60 wanted to fly to Milan, the customer could give the name of the airline company and the destination. The destination—in this case "Milan"—would also be passed to the call centre 50 so that the agent 70 could call up flights to Milan. Indeed, it is possible that technology in the call centre 50 would automatically indicate to the agent 70 all flights to Milan. These additional identifiers are stored in the second field 350 of the message 300. The language identifier mentioned above can also be passed to the telephony system 40 which would select which of the agents 70 can respond in that language.

More generally, the SMS interpreter 30 can interpret a message in a natural language and pass a request for connection through the telephony system 40 to the call centre 50.

The telephony system 40 can also provide to the call centre 50 the customer line identification (CLI) number. This allows the use of a customer relationship management system database 72 in the call centre 50 to bring up details of the customer 60 if that customer's details are stored in the database 72.

In order to identify to which agent 70, a connection should be made, the telephony system 40 is informed which agents 70 are able to accept calls by means of an indicator 74 which may be passed to the telephony system 40. Thus the telephony system 40 knows which agents 70 are available to take calls and does not waste resources trying to make connection when no agents 70 are available. This is implemented in a computer telephony integration (CTI) system incorporated into the workstations used by the agents 70. In another embodiment, the agents 70 could dial a number and log into the system 10 by, for example, using IVR technology.

The invention is described with respect to telephonic communication between the customer and the communications centre. The connection could also be established by means of a data and/or voice connection through a computer network, such as the Internet.

In yet a further embodiment of the invention, the message 300 could include the number on the public switched telephone network or on a mobile network with whom the customer wished to make contact. The telephony system 40 would, using the first field in the message 300, establish the connection between the number and the customer.

In yet a further embodiment of the system, the customer 60 could use a mobile device, PDA, laptop computer, fixed line equipment or PCT or similar which is equipped with a graphical user interface (GUI). In this case, icons on the GUI are associated with services offered to the customer 60 and with reference numbers for the services. This information can be stored as entries, for example, in a flash memory component and can be periodically updated by means of an SMS, GPRS (General Packet Radio Services) or UMTS (Universal Mobile Telephone Services) data transfer.

Initially the entries are either dormant or enabled. When the customer 60 wishes to subscribe to one of the services, the customer 60 enables the service, for example by receipt of a data packet or by entry into the GUI, and the reference number for the service is added. Selecting or calling the icon on the GUI will result in the message 80 being sent to the system 10. The message 80 will include the destination identifier 330 and the reference number in the identifier field 340. The current PSTN number will be selected from the database 35 and a connection set up through the telephony system 40 to the service using the method described above.

The provider of the service can configure the database 35 and select the reference number as required for its own internal purpose. So, for example, when the customer opens a new account with a bank, the PSTN for the bank's call centre 70 is added to the database 35 and a suitable reference number sent to the customer 60. Should the customer then require mortgage services from the bank, a further identifier could be added to the reference number and a new entry made into the database 35 to indicate that any customer sending this further identifier should be connected, in this example, to the agent responsible for mortgages. Similar services could be added using different further identifiers.

The invention claimed is:

1. A communications device for sending a message to a system for establishing a connection between a contact requester and at least one of a plurality of communications centers, wherein the system comprises a message receiver for accepting a message and a contact number from a mobile station, a parser for parsing the message and identifying one or more identifiers in the message, including a destination identifier, a look-up table having a list of the plurality of communications centers and a correlated list of destination identifiers, and a connector adapted to use the look-up table to establish the requested one of the plurality of communications centers from the destination identifier, wherein the connector is adapted to repeatably attempt at least one of telephonic connections between the connector and requested communications center, and telephonic connections between the connector and the contact requestor, until connection between the contact requestor and requested communications center is established, the communications device comprising:

a display device for displaying a graphical user interface;
a first memory for storing a plurality of icons for display on said graphical user interface, wherein the plurality of icons is associated with services offered by at least one of the plurality of communication centers;
a second memory for storing a plurality of destination identifiers associated with one or more of the plurality of icons; and
an update system for periodically updating, by a data transfer, at least one of (i) and (ii):
(i) at least one of the plurality of icons; and
(ii) at least one of the plurality of destination identifiers.

2. The communications device of claim 1 further comprising
a third memory for storing a plurality of reference numbers associated with one or more of the plurality of destination identifiers.

3. The communications device of claim 2 further comprising a update receiver for receiving at least one of (a), (b) and (c):
(a) at least one of the plurality of icons,
(b) at least one of the plurality of destination identifiers, and
(c) at least one of the plurality of reference numbers.

4. The communications device of claim 1 further comprising a selector adapted to select one of the plurality of icons and thereby sending to the system a message.

5. The communications device of claim 1, wherein the second memory stores at least one single destination number for establishing contact with the plurality of communications centers.

6. The communications device of claim 1, wherein the second memory stores at least a stored number allowing establishment of contact with a subscriber through the system.

7. The communication device according to claim 2, wherein at least one of (a), (b) and (c):
(a) at least one of the plurality of icons,
(b) at least one of the plurality of destination identifiers, and
(c) at least one of the plurality of reference numbers,
is stored as an entry in a flash memory component and is adapted to be periodically updated by means of an SMS, GPRS (General Packet Radio Services) or UMTS (Universal Mobile Telephone Services) data transfer.

8. The communication device according to claim 7, wherein the entry is initially dormant and is adapted to be enabled by the contact requester subscribing to one of the services.

9. A communications system for establishing a connection between a contact requester and one or more of a plurality of communications centers, the communications system comprising:
a message receiver for accepting a message and a contact number from a mobile station;
a parser for parsing the message and identifying one or more identifiers in the message, including a destination identifier;
a connector adapted to use the destination identifier and the contact number to first attempt to automatically establish a first telephonic connection between the connector and a requested one of the plurality of communications centers and subsequently establish a second telephonic connection between the connector and the contact requester, thus establishing a complete connection between the contact requester and the requested one of the plurality of communications centers, wherein at least one of the establishment of the first telephonic connection or the establishment of the second telephonic connection between the connector and the contact requester is repeatable until the complete connection is established; and
a look-up table having a list of the plurality of communications centers and a correlated list of destination identifiers, whereby the connector is adapted to use the look-up table to establish the requested one of the plurality of communications centers from the destination identifier; and
a communications device for sending a message to said system, wherein the communications device comprises:
a first memory for storing data associated with a plurality of icons for display on said graphical user interface,
a second memory for storing a plurality of destination identifiers associated with one or more the plurality of icons, wherein the plurality of icons are associated with services offered by at least one of the plurality of communications centers; and
an update system for periodically updating at least at least one of the plurality of icons or the plurality of destination identifiers by means of data transfer.

10. The communication system according to claim 9, further comprising:
a request queuer for queuing in a queue attempts to establish the connection between the contact requester and the requested ones of the plurality of communications centers.

11. The communication system according to claim 9, wherein the connector establishes a telephone connection between the contact requester and a staff member at the requested one of the plurality of communications centers.

12. The communication system according to claim 9, wherein the connector passes to the requested one of the plurality of communications centers at least one of the one or more destination identifiers.

13. The communication system according to claim 9, wherein the connector passes to the requested one of the plurality of communications centers at least the contact number.

14. The communication system according to claim 9, wherein the message is in either a text format, an audio format, a video format or an image format.

15. The communication system according to claim 9 further including at least one timer for timing the length of time required to establish the communications center connection.

16. The communication system according to claim 9, wherein the request queuer places the request at the bottom of the queue if a contact requester connection between the connector and the contact requester cannot be established.

17. The communication system according to claim 9, the connection system further including a list of staff members at the plurality of communications centers to whom requests may currently be sent.

* * * * *